(12) United States Patent
Sumiya et al.

(10) Patent No.: US 12,339,359 B2
(45) Date of Patent: Jun. 24, 2025

(54) TARGET OBJECT DETECTION APPARATUS, TARGET OBJECT DETECTION METHOD, AND NON-TRANSITORY COMPUTER READABLE MEDIUM

(71) Applicant: NEC Corporation, Tokyo (JP)

(72) Inventors: Tatsuya Sumiya, Tokyo (JP); Masayuki Ariyoshi, Tokyo (JP); Kazumine Ogura, Tokyo (JP); Nagma Samreen Khan, Tokyo (JP); Shingo Yamanouchi, Tokyo (JP); Toshiyuki Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/769,602

(22) PCT Filed: Oct. 25, 2019

(86) PCT No.: PCT/JP2019/042031
§ 371 (c)(1),
(2) Date: Apr. 15, 2022

(87) PCT Pub. No.: WO2021/079518
PCT Pub. Date: Apr. 29, 2021

(65) Prior Publication Data
US 2024/0125929 A1    Apr. 18, 2024

(51) Int. Cl.
*G01V 3/12* (2006.01)
*G01S 17/06* (2006.01)

(52) U.S. Cl.
CPC .................. *G01S 17/06* (2013.01)

(58) Field of Classification Search
CPC ...................................... G01S 17/06
See application file for complete search history.

(56) References Cited

U.S. PATENT DOCUMENTS

2003/0117310 A1   6/2003   Kikuchi et al.
2007/0001895 A1*  1/2007   Kolinko ............... G01V 8/005
                                                         342/179

(Continued)

FOREIGN PATENT DOCUMENTS

JP   2003-177175 A    6/2003
JP   2006-331336 A   12/2006

(Continued)

OTHER PUBLICATIONS

Translation of JP2017223575A (Year: 2017).*

(Continued)

*Primary Examiner* — David P Porta
*Assistant Examiner* — Mamadou Faye

(57) ABSTRACT

A target object detection apparatus (20) includes an acquisition unit (210), a likelihood information generation unit (220), and a determination unit (230). The acquisition unit (210) acquires an IF signal from an irradiation apparatus (10) at a plurality of timings. The likelihood information generation unit (220) executes, by processing the IF signal, processing of generating, with respect to each of a plurality of IF signals, likelihood information for a region (hereinafter, referred to as a target object region) having a possibility in that an accompaniment, i.e., a target object is present. The likelihood information indicates a distribution of presence probabilities of a target object in at least a height direction in a target object region. Then, the determination unit (230) determines a presence or absence of a target object, by using likelihood information generated for each of a plurality of target object regions.

10 Claims, 8 Drawing Sheets

(56) References Cited

U.S. PATENT DOCUMENTS

| | | | | |
|---|---|---|---|---|
| 2010/0241009 A1* | 9/2010 | Petkie | ............... | G01S 7/35 |
| | | | | 342/147 |
| 2015/0208003 A1 | 7/2015 | Kuznetsov et al. | | |
| 2015/0293221 A1* | 10/2015 | Ahmed | ............ | G01S 13/89 |
| | | | | 342/179 |
| 2016/0216371 A1 | 7/2016 | Ahmed et al. | | |

FOREIGN PATENT DOCUMENTS

| | | | |
|---|---|---|---|
| JP | 2017-040593 A | | 2/2017 |
| JP | 2017-508949 A | | 3/2017 |
| JP | 2017223575 A | * | 12/2017 |

OTHER PUBLICATIONS

International Search Report for PCT Application No. PCT/JP2019/042031, mailed on Jan. 21, 2020.
JP Office Communication for JP Application No. 2021-553880, mailed on Aug. 15, 2023 with English Translation.

\* cited by examiner

TARGET OBJECT DETECTION APPARATUS, TARGET OBJECT DETECTION METHOD, AND NON-TRANSITORY COMPUTER READABLE MEDIUM

This application is a National Stage Entry of PCT/JP2019/042031 filed on Oct. 25, 2019, the contents of all of which are incorporated herein by reference, in their entirety.

TECHNICAL FIELD

The present invention relates to a target object detection apparatus, a target object detection method, and a program.

BACKGROUND ART

In a facility such as an airport, bringing-in of a specific article may be regulated. In such a facility, at an admission gate to a facility or in a passage leading to a facility, belongings of a person are frequently inspected. As a technique related to the inspection, there are apparatuses described in Patent Documents 1 and 2. Patent Document 1 describes that a millimeter wave emitted from a person is received and thereby an image is generated. Patent Document 2 also describes that microwaves are irradiated to a person from three directions, reflection waves of the microwaves are analyzed, and thereby an image is generated.

Further, Patent Document 3 describes that an apparatus that reads personal authentication information is disposed at a doorway.

RELATED DOCUMENT

Patent Document

[Patent Document 1] Japanese Patent Application Publication No. 2003-177175
[Patent Document 2] U.S. Patent Application Publication No. 2016/0216371 specification
[Patent Document 3] Japanese Patent Application Publication No. 2006-331336

DISCLOSURE OF THE INVENTION

Technical Problem

When an electromagnetic wave is irradiated to a moving target object, a reflection wave of the electromagnetic wave is analyzed, and thereby a presence of the target object is detected, the reflection wave may be mixed with noise. In this case, detection accuracy of a target object may decrease.

An object of the present invention is to increase, when an electromagnetic wave is irradiated, a reflection wave of the electromagnetic wave is analyzed, and thereby a target object is detected, detection accuracy of this case.

Solution to Problem

According to the present invention, provided is a target object detection apparatus being used together with an irradiation apparatus, the irradiation apparatus including
an irradiation unit that executes, at a plurality of timings, processing of irradiating an electromagnetic wave to a region, while the region being scanned, through which a target object passes, and
a reception unit that receives a reflection wave acquired from the electromagnetic wave being reflected by the target object, and generates an IF signal being an intermediate frequency signal from the received reflection wave, the target object detection apparatus including:
a likelihood information generation unit that executes, by processing the IF signal generated by the reception unit, processing of generating, at the plurality of timings each, likelihood information indicating a distribution of presence probabilities of the target object in at least a height direction in a target object region having a possibility in that the target object is present; and
a determination unit that determines a presence or absence of the target object by using the likelihood information generated at the plurality of timings each.

According to the present invention, provided is a target object detection method executed by a computer, in which
the computer is used together with an irradiation apparatus, and
the irradiation apparatus executes, at a plurality of timings, processing of irradiating an electromagnetic wave to a region, while the region being scanned, through which a target object passes, and receives a reflection wave acquired from the electromagnetic wave being reflected by the target object, and generates an IF signal being an intermediate frequency signal from the received reflection wave, the target object detection method including:
by the computer,
executing, by processing the IF signal, processing of detecting, at a plurality of timings each, a target object region having a possibility in that the target object is present and generating likelihood information indicating a distribution of presence probabilities of the target object in at least a height direction in the target object region; and
determining a presence or absence of the target object by using the likelihood information generated at the plurality of timings each.

According to the present invention, provided is a program executed by a computer being used together with an irradiation apparatus, in which
the irradiation apparatus executes, at a plurality of timings, processing of irradiating an electromagnetic wave to a region, while the region being scanned, through which a target object passes, receives a reflection wave acquired from the electromagnetic wave being reflected by the target object, and generates an IF signal being an intermediate frequency signal from the received reflection wave, the program causing the computer to have:
a function of executing, by processing the IF signal, processing of detecting, at the plurality of timings each, a target object region having a possibility in that the target object is present and generating likelihood information indicating a distribution of presence probabilities of the target object in at least a height direction in the target object region; and
a function of determining a presence or absence of the target object by using the likelihood information generated at the plurality of timings each.

Advantageous Effects of Invention

According to the present invention, when an electromagnetic wave is irradiated, a reflection wave of the electromagnetic wave is analyzed, and thereby a target object is detected, detection accuracy of this case can be increased.

BRIEF DESCRIPTION OF THE DRAWINGS

The above-described object, other objects, features, and advantages will become more apparent from a preferred example embodiment described below and the following accompanying drawings.

DESCRIPTION OF EMBODIMENTS

Hereinafter, an example embodiment according to the present invention is described by using the accompanying drawings. Note that, in each drawings, a similar component is assigned with a similar reference sign, and description thereof is not repeated as appropriate.

Figure 1:
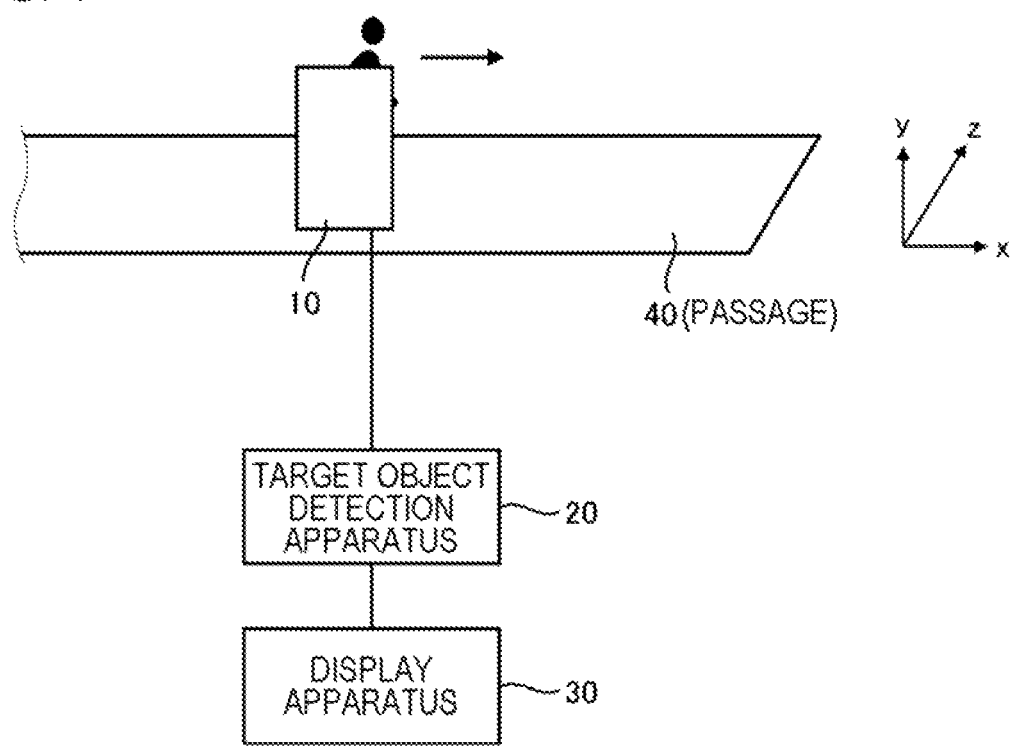
FIG. 1 is a diagram illustrating a usage environment of a target object detection apparatus according to an example embodiment.

FIG. 1 is a diagram illustrating a usage environment of a target object detection apparatus 20 according to an example embodiment. The target object detection apparatus 20 is used together with an irradiation apparatus 10 and a display apparatus 30.

The irradiation apparatus 10 irradiates an electromagnetic wave to a subject such as a passerby and the like, and receives a reflection wave generated by reflection of the electromagnetic wave by the subject. Further, the irradiation apparatus 10 frequency-converts the received reflection wave into an intermediate frequency band, and thereby generates an intermediate frequency signal (IF signal).

As an electromagnetic wave irradiated by the irradiation apparatus 10, an electromagnetic wave having a wavelength that is transmitted through cloth (e.g., clothing) but is reflected by a subject itself (e.g., a human body) or an accompaniment of a subject is desirably used. As one example, an electromagnetic wave is a microwave, a millimeter wave, or a terahertz wave, and has a wavelength of equal to or more than 30 micrometers and equal to or less than one meter. Note that, in FIG. 1, a horizontal direction of a plane to which an electromagnetic wave is irradiated by the irradiation apparatus is an x direction, a vertical direction (upper and lower direction) is a y direction, and a direction where an electromagnetic wave is irradiated is a z direction. In other words, when viewed from a subject, a moving direction is substantially an x direction, an upper and lower direction is a y direction, and a direction substantially orthogonal to a moving direction of a subject is a z direction. The irradiation apparatus 10 executes, at a plurality of timings, the processing of generating an IF signal described above. The irradiation apparatus 10 executes the processing of generating an IF signal described above, for example, 10 times or more (preferably 20 times or more) per second.

Note that, in the example illustrated in FIG. 1, the irradiation apparatus 10 is disposed in parallel with a passage of a subject, but the irradiation apparatus 10 may be disposed in such a way as to have an angle other than 180° with respect to the passage.

The target object detection apparatus 20 acquires an IF signal from the irradiation apparatus 10, and thereby generates, by processing the IF signal, three-dimensional position information indicating a three-dimensional shape of at least a part of a subject. The three-dimensional position information includes information for determining each of a distance from a portion (reflection point) to which an electromagnetic wave is irradiated in a subject and an angle of a reflection point based on the irradiation apparatus 10 (e.g., an antenna included in a reception unit 130). A distance determined based on three-dimensional position information may be a distance to a target portion from, for example, a transmission antenna included in a transmission unit 110 to be described later, may be a distance to a target portion from a reception antenna included in the reception unit 130, or may be an average value of both of these distances. Note that, three-dimensional position information preferably includes information of intensity of a reflection wave at each position. When a subject has an accompaniment (e.g., belongings), three-dimensional position information may be also information for determining a three-dimensional shape of at least a part of the accompaniment.

The target object detection apparatus 20 determines a presence or absence of an accompaniment, and displays information indicating a determination result on the display apparatus 30. Note that, a detection target of the target object detection apparatus 20 is not limited to the above-described accompaniment.

Further, the target object detection apparatus 20 generates, as necessary, a two-dimensional or three-dimensional image of a subject, and displays the generated image on the display apparatus 30. When a subject has an accompaniment, the image includes the accompaniment.

Note that, the irradiation apparatus 10 further includes a sensor (e.g., a human sensor) that detects a subject entering an irradiation target region and a sensor (e.g., a human sensor) that detects a subject leaving the irradiation target region. The irradiation apparatus 10 or the target object detection apparatus 20 can determine, by using detection results of these sensors, a plurality of IF signals relevant to the same subject. Instead of a sensor, by using a received reflection wave, detection of a subject may be executed.

Figure 2:
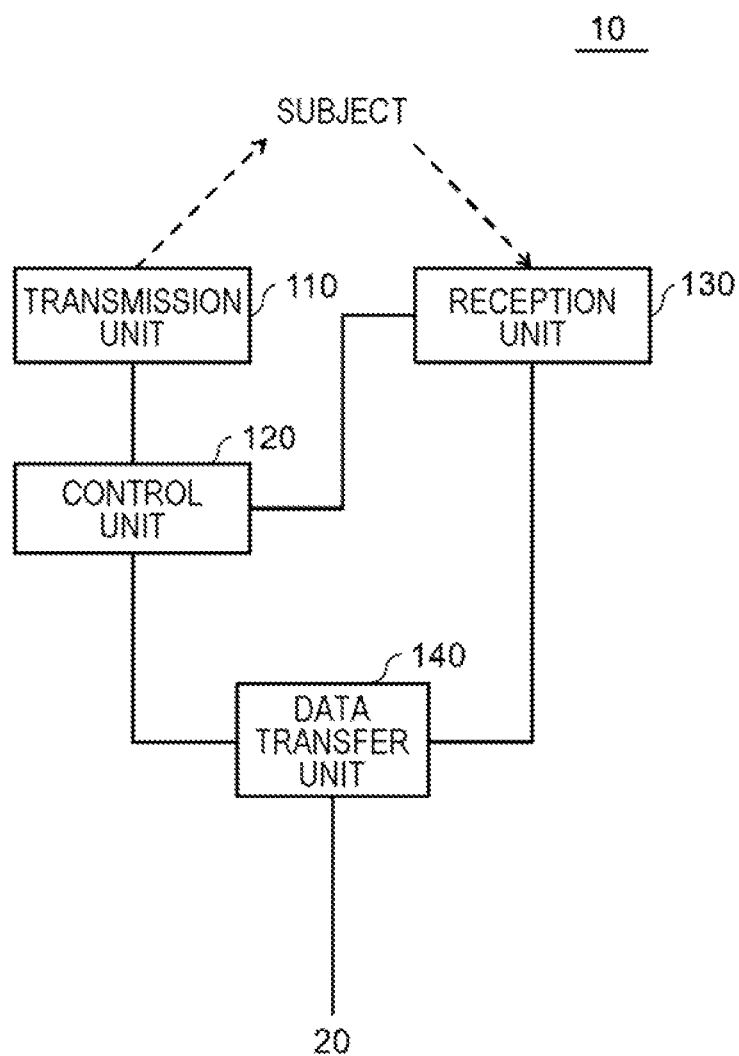
FIG. 2 is a diagram illustrating one example of a function configuration of an irradiation apparatus.

FIG. 2 is a diagram illustrating one example of a function configuration of the irradiation apparatus 10. In an example illustrated in the present figure, the irradiation apparatus 10 includes the transmission unit 110, a control unit 120, the reception unit 130, and a data transfer unit 140.

The transmission unit 110 irradiates an electromagnetic wave toward a region (hereinafter, referred to as an irradiation region) through which a subject passes. The transmission unit 110 includes, for example, an omnidirectional antenna. The transmission unit 110 can modify a frequency of an electromagnetic wave in a fixed range. The transmission unit 110 is controlled by the control unit 120. Note that, the control unit 120 also controls the reception unit 130.

The reception unit 130 receives a reflection wave based on a subject. The reception unit 130 frequency-converts the received reflection wave into an intermediate frequency band, and thereby generates an intermediate frequency signal (IF signal). The control unit 120 executes control for setting an intermediate frequency band in the reception unit 130 as an appropriate value.

The data transfer unit 140 acquires an IF signal generated in the reception unit 130, and outputs the acquired IF signal to the target object detection apparatus 20. Further, the data transfer unit 140 desirably outputs, to the target object detection apparatus 20, also a time at which transmission is executed or a time at which an IF signal is generated (hereinafter, alto referred to as time information).

Figure 3:
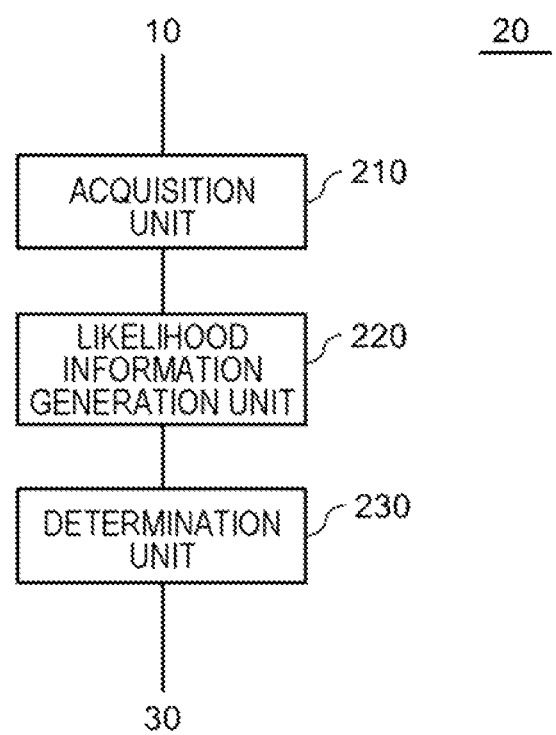
FIG. 3 is a diagram illustrating one example of a function configuration of the target object detection apparatus.

FIG. 3 is a diagram illustrating one example of a function configuration of the target object detection apparatus 20. The target object detection apparatus 20 includes an acquisition unit 210, a likelihood information generation unit 220, and a determination unit 230. The acquisition unit 210 acquires an IF signal from the irradiation apparatus 10 at a plurality of timings. In other words, the acquisition unit 210 acquires, at a plurality of times, an IF signal relating to the same subject. The likelihood information generation unit 220 generates, by processing an IF signal, three-dimensional position information of reflection intensity from a subject. In other words, the likelihood information generation unit 220 computes, when generating three-dimensional position information, a distance from the irradiation apparatus 10 to a reflection point and an arrival angle (i.e., the above-described angle of a reflection point) of a reflection wave. The likelihood information generation unit 220 executes, with respect to each IF signal, processing of generating three-dimensional position information. Further, the likelihood information generation unit 220 generates, by processing three-dimensional position information, a two-dimensional or three-dimensional image of a subject. When an accompaniment is present, three-dimensional position information and an image also include the accompaniment.

Further, the likelihood information generation unit 220 executes, by processing an IF signal, processing of generating likelihood information relating to a region (hereinafter, referred to as a target object region) having a possibility in that an accompaniment, i.e., a target object is present, with respect to each of a plurality of IF signals, i.e., each of a plurality of pieces of three-dimensional position information. The likelihood information indicates, in a target object region, a distribution of presence probabilities of a target object in at least a height direction. Then, the determination unit 230 determines a presence or absence of a target object by using likelihood information generated for each of a plurality of target object regions. Details of processing executed by the likelihood information generation unit 220 and processing executed by the determination unit 230 are described later.

Figure 4:
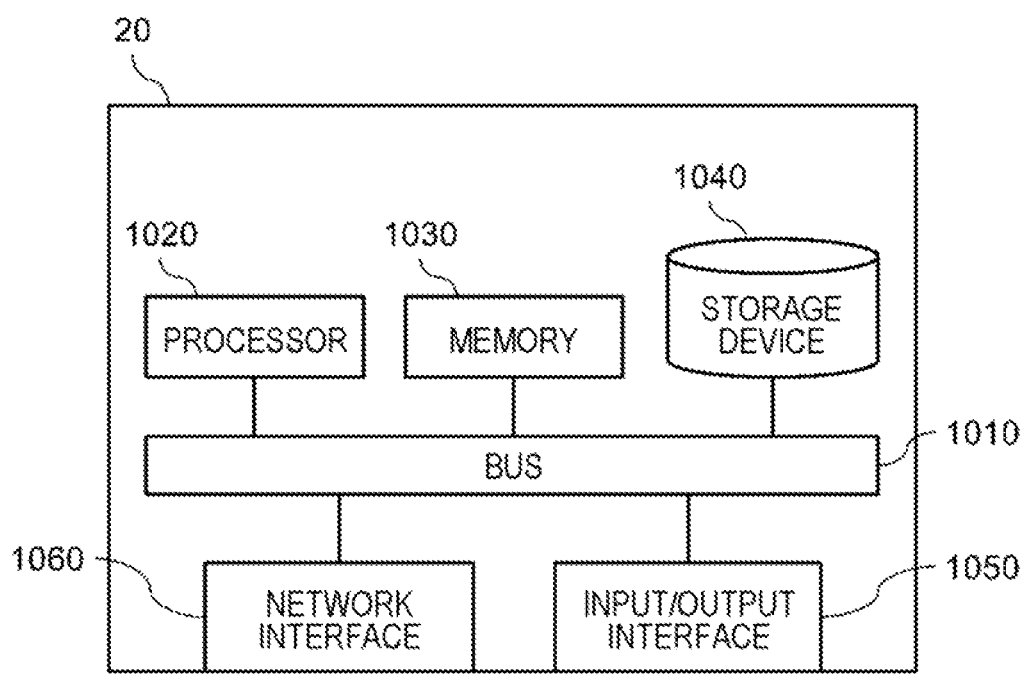
FIG. 4 is a block diagram illustrating a hardware configuration of the target object detection apparatus.

FIG. 4 is a block diagram illustrating a hardware configuration of the target object detection apparatus 20. The target object detection apparatus 20 includes a bus 1010, a processor 1020, a memory 1030, a storage device 1040, an input/output interface 1050, and a network interface 1060.

The bus 1010 is a data transmission path where the processor 1020, the memory 1030, the storage device 1040, the input/output interface 1050, and the network interface 1060 mutually transmit/receive data. However, a method of mutually connecting the processor 1020 and the like is not limited to bus connection The processing 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores program modules for achieving each function (e.g., the acquisition unit 210, the likelihood information generation unit 220, and the determination unit 230) of the target object detection apparatus 20. The processor 1020 reads each of the program modules onto the memory 1030, executes the read program module, and thereby achieves each function relevant to the program module. Further, the storage device 1040 also functions as various types of storage units.

The input/output interface 1050 is an interface for connecting the target object detection apparatus 20 and various types of input/output devices (e.g., the display apparatus 30).

The network interface 1060 is an interface for connecting the target object detection apparatus 20 to another apparatus (e.g., the irradiation apparatus 10) on a network. However, the network interface 1060 may not always be used.

Figure 5:
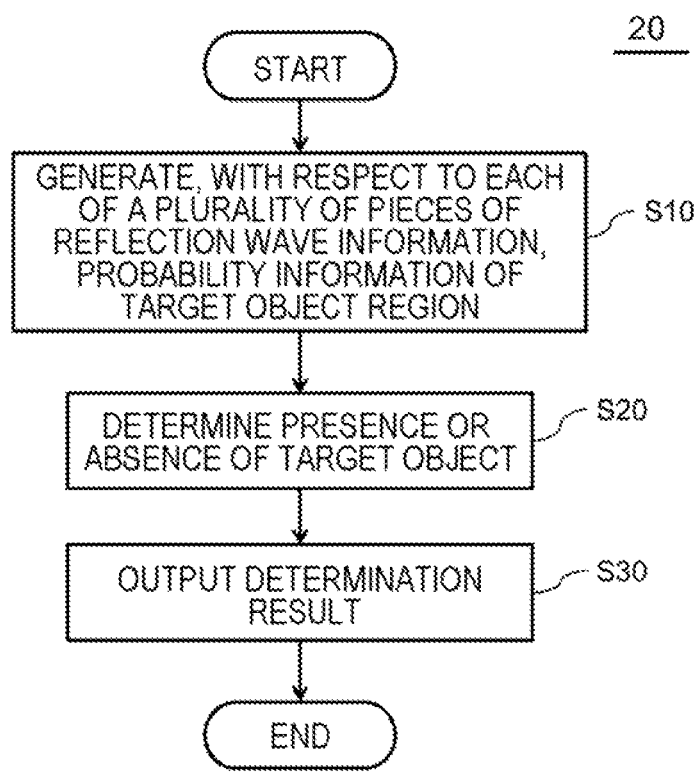
FIG. 5 is a flowchart illustrating one example of processing executed by the target object detection apparatus.

FIG. 5 is a flowchart illustrating one example of processing executed by the likelihood information generation unit 220 and the determination unit 230 of the target object detection apparatus 20. As described above, when a subject passes near the irradiation apparatus 10, the irradiation apparatus 10 generates an IF signal at a plurality of timings. Then, the irradiation apparatus 10 successively transmits a plurality of the IF signals to the target object detection apparatus 20.

The acquisition unit 210 of the target object detection apparatus 20 successively receives a plurality of the IF signals. Then, the likelihood information generation unit 220 generates, by processing the IF signals, three-dimensional position information and likelihood information with respect to each IF signal. The likelihood information indicates, as described above, a distribution of presence probabilities of a target object in at least a height direction in a target object region. The likelihood information generation unit 220 generates the likelihood information, for example, by using a result of machine learning (step S10). A presence probability is computed, for example, by recognition processing for each portion (segment) of a two-dimensional or three-dimensional image.

Herein, the likelihood information generation unit 220 may determine, together with likelihood information, a type of an accompaniment. When the likelihood information generation unit 220 uses, for example, a result of machine learning using training data, a type of an accompaniment can be determined by including a type of an accompaniment in training data.

Next, the determination unit 230 determines, by processing likelihood information with respect to each IF signal, a presence or absence of a target object (step S20). Details of the determination processing are described later. Then, the determination unit 230 outputs a determination result to, for example, the display apparatus 30 and displays the output determination result (step S30).

Note that, in the step S10, the likelihood information generation unit 220 may generate a two-dimensional or three-dimensional image. In this case, in the step S30, the determination unit 230 may display an image on the display apparatus 30.

Note that, when the irradiation apparatus 10 is installed at a gate, the determination unit 230 may display, before a subject finishes passing through the gate, a determination result on the display apparatus 30.

Figure 6:
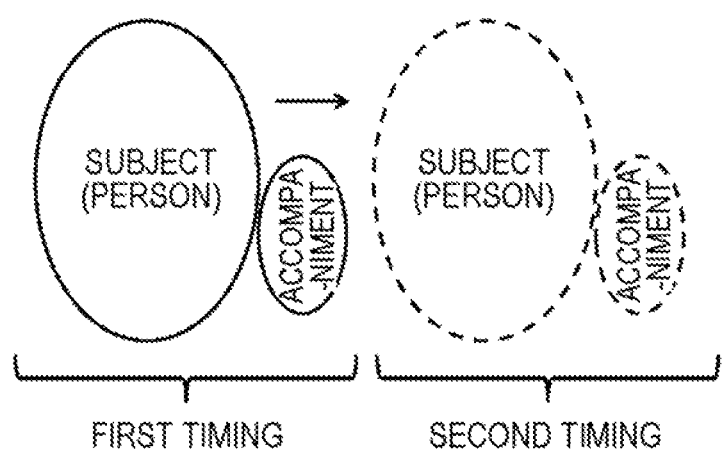
FIG. 6 is a diagram for illustrating a generation timing of IF information.
Figure 6:
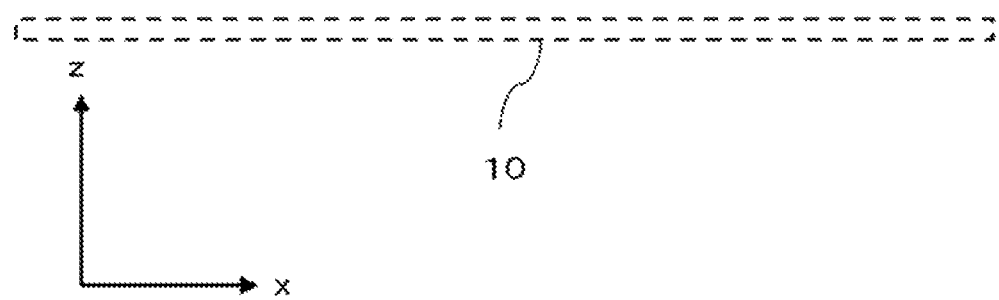

FIG. 6 is a diagram for illustrating a generation timing of an IF signal. The irradiation apparatus 10 is disposed along a region (e.g., a part of a passage) through which a subject passes. Then, when a subject passed near the irradiation apparatus 10, the irradiation apparatus 10 generates an IF signal. Herein, a subject moves, and therefore an IF signal and three-dimensional position information generated based on the IF signal may be mixed with noise. In this case, even when an IF signal is processed and a two-dimensional or three-dimensional image is generated, it may be difficult to determine a presence of an accompaniment, or an accompaniment being absent may be determined as being present.

On the other hand, when a subject passes, it is estimated that a fluctuation amount of a height of an accompaniment is small. Therefore, when heights of regions where an accompaniment is estimated to be present are substantially the same at both of a first timing and a second timing, an accompaniment is actually present with high probability. The determination unit 230 determines, based on the principle, a presence or absence of an accompaniment (target object).

Figure 7:
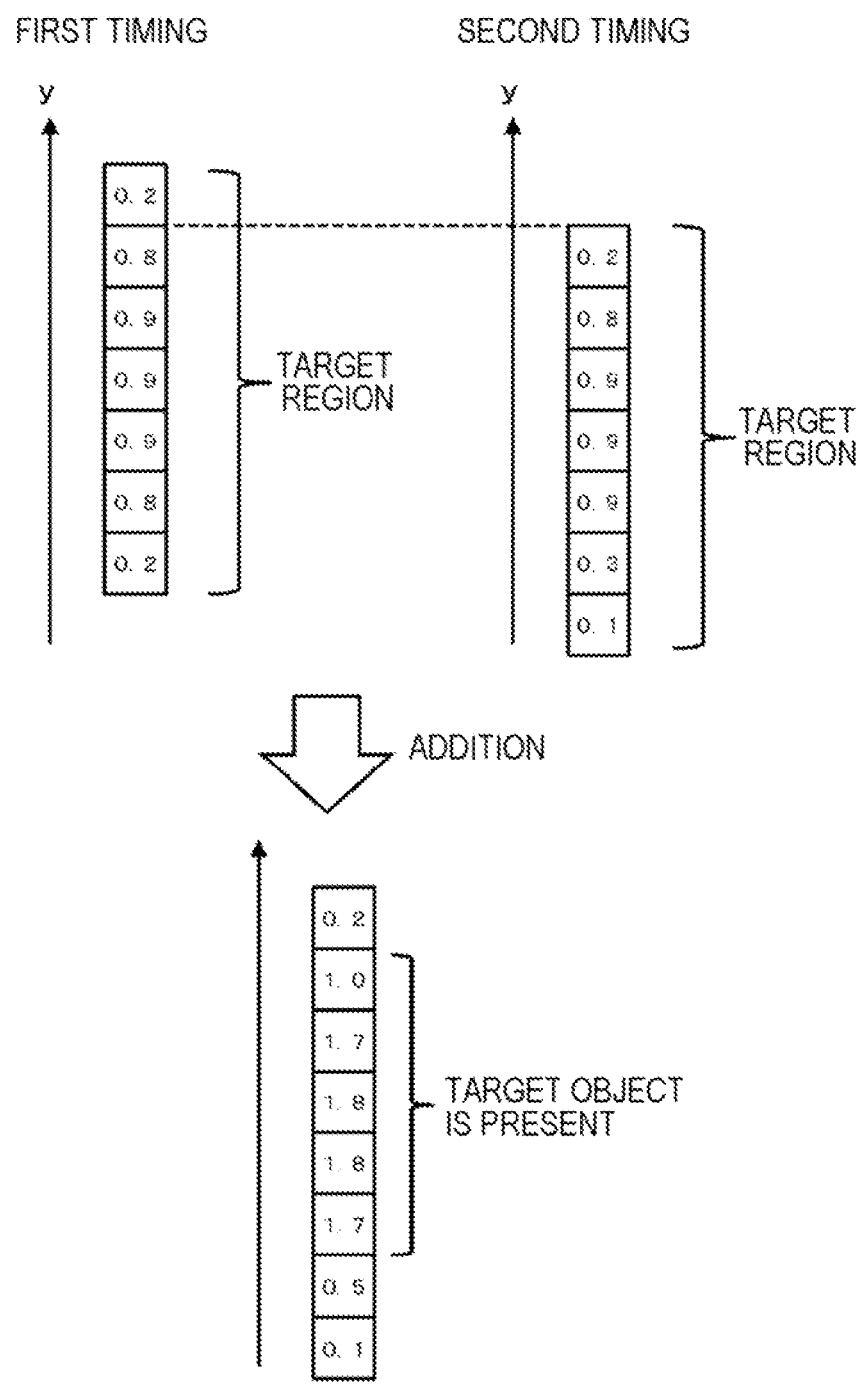
FIG. 7 is a diagram for illustrating a first example of processing executed by a determination unit.

FIG. 7 is a diagram for illustrating a first example of processing executed by the determination unit 230. In the example illustrated in the present figure, likelihood information indicates a distribution of presence probabilities in a height direction (y-direction). Specifically, a target object region is divided into a plurality of sub-regions. The sub-region may be provided, for example, relevantly to each pixel of two-dimensional image or three-dimensional image, one sub-region may be allocated to a plurality of pixels, or the sub-region may be the same as the above-described segment. In the example in FIG. 7, for example, a plurality of pixels having the same height (y-coordinate) are allocated to the same sub-region. Then, likelihood information indicates a presence probability of an accompaniment with respect to each sub-region. A presence probability in each sub-region is evaluated, for example, as a maximum value or the like of a presence probability on allocated pixels. The likelihood information may be computed based on a type of an accompaniment, i.e., a type of a target object. The determination unit 230 adds, with respect to each of these sub-regions, presence probabilities generated at a plurality of timings each (in other words, adds presence probabilities being at the same coordinate in a height direction (y-axis direction), and determines, by using a result of the addition, a presence or absence of the target object.

The determination unit 230 determines, for example, a maximum value of a presence probability sum acquired by addition with respect to each sub-region. In the example illustrated in FIG. 7, the maximum value is 1.8. Then, when the maximum value is equal to or more than a reference value, it is determined that an accompaniment is present.

Herein, when, with respect to each of a plurality of IF signals generated at a continuous timing, a presence probability exceeds zero (or when the present probability exceeds a reference value exceeding zero) in the same sub-region, the determination unit 230 may add a value according to the number of the continuous IF signals to an addition value relevant to the sub-region. The reason is that, when it is continuously estimated that an accompaniment is present, an accompaniment is actually present with high probability.

Further, the determination unit 230 computes, with respect to each sub-region, an average value of presence probabilities generated at a plurality of timings each, and may determine, when a maximum value of the average value is equal to or more than a reference value, that an accompaniment is present. The determination unit 230 divides, for example, a presence probability sum acquired by addition with respect to each sub-region by the number of IF signals used (2 in the example illustrated in FIG. 7), and thereby may compute an average value of presence probabilities with respect to each sub-region.

Note that, in the two examples described above, a reference value may be provided based on a type of an accompaniment, i.e., a type of a target object. When, for example, the irradiation apparatus 10 is disposed at an entrance of a facility, an object undesirable to be brought in the facility is set as a target object. Then, there are a plurality of target objects set, for at least some of these target objects, a reference value having a value different for others is set.

Note that, instead of a sum or an average of presence probabilities, by using a sum or an average of score values f(p) computed from a presence probability p, presence determination of an accompaniment may be executed.

One example of f(p) is that, for all sub-regions other than sub-regions having a presence probability of 0, a value is set as a constant (e.g., 1). Further, when a high presence probability is weighed more heavily, processing may be executed in such a way that f(p) is set as "0" for all sub-regions having a presence probability of equal to or more than a certain value (however, exceeding 0) and f(p) is set to remain or as a constant for all remaining sub-regions (i.e., for all sub-regions having a presence probability of more than a certain value). Further, $f(p)=p^2$ or $f(p)=\log(p)$ may be satisfied.

Figure 8:
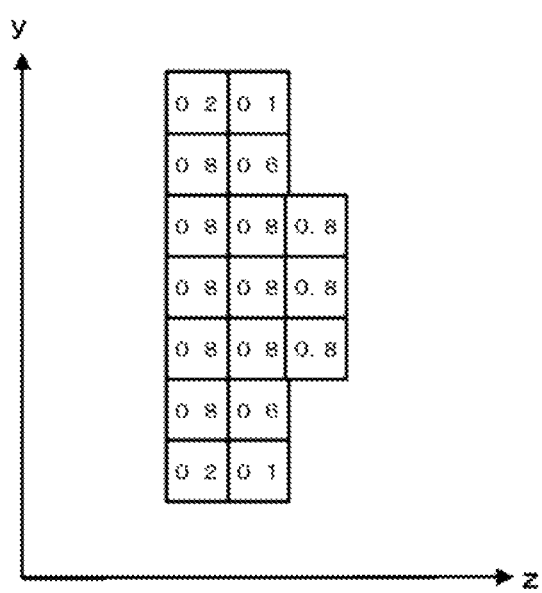
FIG. 8 is a diagram for illustrating a second example of processing executed by the determination unit.

FIG. 8 is a diagram for illustrating a second example of processing executed by the determination unit 230. In the example illustrated in the present figure, likelihood information two-dimensionally indicates a distribution of present probabilities in a height direction and a horizontal direction. Specifically, sub-regions are two-dimensionally arrayed in a height direction (y-direction) and a width (depth) direction (z-direction). In the example illustrated in FIG. 8, for example, a sub-region is provided relevantly to each of pixels on a yz plane configuring a tow-dimensional or three-dimensional image. In this case, the determination unit 230 may execute the above-described processing with respect to each sub-region.

Further, the determination unit 230 may generate, by executing processing of adding presence probabilities of sub-regions located at the same height, data (i.e., a distribution of present probabilities of a height direction) as illustrated in FIG. 7. In this case, processing thereafter is as described above.

As described above, according to the present example embodiment, the target object detection apparatus 20 acquires, from the irradiation apparatus 10, a plurality of IF signals generated at timings different for the same subject. Then, the target object detection apparatus 20 generates likelihood information with respect to each of a plurality of these IF signals. The likelihood information indicates a distribution of present probabilities of a target object in at least a height direction. Then, by using a plurality of pieces of likelihood information generated, it is determined whether an accompaniment of a subject, i.e., a target object is present.

As described above, when a subject passes, a fluctuation amount of a height of an accompaniment is small. Therefore, when, at a plurality of timings, heights of regions where an accompaniment is estimated to be present are substantially the same, an accompaniment is actually present with high probability. Therefore, the target object detection apparatus 20 can determine a presence or absence of a target object with high probability.

While with reference to the accompanying drawings, the example embodiments according to the present invention have been described, the example embodiments are illustrative of the present invention and various configurations other than the above-described configurations are employable.

Further, in a plurality of flowcharts used in the above-described description, a plurality of steps (processing) are described in order, but an execution order of steps to be executed according to each example embodiment is not limited to the described order. According to each example embodiment, an order of illustrated steps can be modified within an extent that there is no harm in context. Further, the above-described example embodiments can be combined within an extent that there is no conflict in content.

The whole or part of the example embodiment described above can be described as, but not limited to, the following supplementary notes.

1. A target object detection apparatus being used together with an irradiation apparatus, the irradiation apparatus including
    an irradiation unit that executes, at a plurality of timings, processing of irradiating an electromagnetic wave to a region, while the region being scanned, through which a target object passes, and
    a reception unit that receives a reflection wave acquired from the electromagnetic wave being reflected by the target object, and generates an IF signal being an intermediate frequency signal from the received reflection wave,
    the target object detection apparatus including:
    a likelihood information generation unit that executes, by processing the IF signal generated by the reception unit, processing of generating, at the plurality of timings each, likelihood information indicating a distribution of presence probabilities of the target object in at least a height direction in a target object region having a possibility in that the target object is present; and
    a determination unit that determines a presence or absence of the target object by using the likelihood information generated at the plurality of timings each.

2. The target object detection apparatus according to the above supplementary note 1, in which
    the target object region is divided into a plurality of sub-regions,
    the likelihood information indicates, based on the plurality of sub-regions each, the presence probability, and
    the determination unit adds, with respect to each sub-region, the presence probabilities generated at the plurality of timings each, and determines, by using a result of the addition, a presence or absence of the target object.

3. The target object detection apparatus according to the above supplementary note 2, in which
    the determination unit determines, when a maximum value of the presence probability after addition is equal to or more than a reference value, that the target object is present.

4. The target object detection apparatus according to the above supplementary note 2, in which
    the determination unit computes an average value of the presence probabilities generated based on the plurality of sub-regions each at the plurality of timings each, and determines, when a maximum value of the average value is equal to or more than a reference value, that the target object is present.

5. The target object detection apparatus according to the above supplementary note 3 or 4, in which
    the target object includes a plurality of types, and
    the reference value is set for each of the types.

6. The target object detection apparatus according to any one of the above supplementary notes 1 to 5, in which
    the likelihood information two-dimensionally indicates a distribution of the presence probabilities in a height direction and a horizontal direction.

7. The target object detection apparatus according to the above supplementary notes 1 to 6, in which
    the target object is belongings of a person.

8. The target object detection apparatus according to any one of the above supplementary note 1 to 7, in which
    a wavelength of the electromagnetic wave is equal to or more than 30 micrometers and equal to or less than one meter.

9. A target object detection method executed by a computer, in which
    the computer is used together with an irradiation apparatus, and
    the irradiation apparatus executes, at a plurality of timings, processing of irradiating an electromagnetic wave to a region, while the region being scanned, through which a target object passes, receives a reflection wave acquired from the electromagnetic wave being reflected by the target object, and generates an IF signal being an intermediate frequency signal from the received reflection wave,
    the target object detection method including:
    by the computer,
        executing, by processing the IF signal, processing of detecting, at a plurality of timings each, a target object region having a possibility in that the target object is present and generating likelihood information indicating a distribution of presence probabilities of the target object in at least a height direction in the target object region; and
        determining a presence or absence of the target object by using the likelihood information generated at the plurality of timings each.

10. The target object detection method according to the above supplementary note 9, in which
    the target object region is divided into a plurality of sub-regions,
    the likelihood information indicates, based on the plurality of sub-regions each, the presence probability, and
    the computer adds, with respect to each sub-region, the presence probabilities generated at the plurality of timings each, and determines, by using a result of the addition, a presence or absence of the target object.

11 The target object detection method according to the above supplementary note 10, in which
    the computer determines, when a maximum value of the presence probability after addition is equal to or more than a reference value, that the target object is present.

12. The target object detection method according to the above supplementary note 10, in which
    the computer computes an average value of the presence probabilities generated based on the plurality of sub-regions each at the plurality of timings each, and determines, when a maximum value of the average value is equal to or more than a reference value, that the target object is present.

13. The target object detection method according to the above supplementary note 11 or 12, in which
    the target object includes a plurality of types, and
    the reference value is set for each of the types.

14. The target object detection method according to any one of the above supplementary notes 9 to 13, in which
the likelihood information two-dimensionally indicates a distribution of the presence probabilities in a height direction and a horizontal direction.
15. The target object detection method according to the above supplementary notes 9 to 14, in which
the target object is belongings of a person.
16. The target object detection method according to any one of the above supplementary notes 9 to 15, in which
a wavelength of the electromagnetic wave is equal to or more than 30 micrometers and equal to or less than one meter.
17. A program executed by a computer being used together with an irradiation apparatus, in which
the irradiation apparatus executes, at a plurality of timings, processing of irradiating an electromagnetic wave to a region, while the region being scanned, through which a target object passes, receives a reflection wave acquired from the electromagnetic wave being reflected by the target object, and generates an IF signal being an intermediate frequency signal from the received reflection wave,
the program causing the computer to have:
a function of executing, by processing the IF signal, processing of detecting, at the plurality of timings each, a target object region having a possibility in that the target object is present and generating likelihood information indicating a distribution of presence probabilities of the target object in at least a height direction in the target object region; and
a function of determining a presence or absence of the target object by using the likelihood information generated at the plurality of timings each.
18. The program according to the above supplementary note 17, in which
the target object region is divided into a plurality of sub-regions,
the likelihood information indicates, based on the plurality of sub-regions each, the presence probability, and
the computer adds, with respect to each sub-region, the presence probabilities generated at the plurality of timings each, and determines, by using a result of the addition, a presence or absence of the target object.
19. The program according to the above supplementary note 18, in which the computer determines, when a maximum value of the presence probability after addition is equal to or more than a reference value, that the target object is present.
20. The program according to the above supplementary note 18, in which
the computer computes an average value of the presence probabilities generated based on the plurality of sub-regions each at the plurality of timings each, and determines, when a maximum value of the average value is equal to or more than a reference value, that the target object is present.
21. The program according to the above supplementary note 19 or 20, in which
the target object includes a plurality of types, and
the reference value is set for each of the types.
22. The program according to any one of the above supplementary notes 17 to 21, in which
the likelihood information two-dimensionally indicates a distribution of the presence probabilities in a height direction and a horizontal direction.
23. The program according to the above supplementary notes 17 to 22, in which
the target object is belongings of a person.
24. The program according to any one of the above supplementary notes 17 to 23, in which
a wavelength of the electromagnetic wave is equal to or more than 30 micrometers and equal to or less than one meter.

REFERENCE SIGNS LIST

10 Irradiation apparatus
20 Target object detection apparatus
30 Display apparatus
110 Transmission unit
120 Control unit
130 Reception unit
140 Data transfer unit
210 Acquisition unit
220 Likelihood information generation unit
230 Determination unit

What is claimed is:
1. A target object detection apparatus used together with an irradiation apparatus, the irradiation apparatus comprising:
a transmitter that executes, at a plurality of timings, processing of irradiating an electromagnetic wave to a region through which a target object passes, while the region is being scanned;
a receiver that receives a reflection wave acquired from the electromagnetic wave being reflected by the target object, and generates an IF signal being an intermediate frequency signal from the received reflection wave;
at least one memory storing instructions; and
at least one processor configured to execute the instructions to perform operations comprising:
identifying, at each of the plurality of timings, a target object region where there is a possibility in that the target object is present and a type of the target object which may exist in the target region, by processing the IF signal generated by the receiver;
generating, at each of the plurality of timings, likelihood information for each of a plurality of the types of the target object, the likelihood information indicating a distribution of presence probabilities of the target object in at least a height direction in the target object region, based on processing results of the IF signal; and
determining, for each of the plurality of the types of the target object, a presence or absence of the target object by using the likelihood information generated at each of the plurality of timings.
2. The target object detection apparatus according to claim 1, wherein
the target object region is divided into a plurality of sub-regions,
the likelihood information indicates, based on each of the plurality of sub-regions, the presence probability, and
determining the presence or absence of the target object comprises:
adding, with respect to each sub-region, the presence probabilities generated at each of the plurality of timings, to generate a sum; and
determining, by using the sum, the presence or absence of the target object.
3. The target object detection apparatus according to claim 2, wherein determining the presence or absence of the target object comprises determining, when a maximum value of the sum is equal to or more than a reference value, that the target object is present.

4. The target object detection apparatus according to claim 2, wherein determining the presence or absence of the target object comprises:
   computing an average value of the presence probabilities generated based on each of the plurality of sub-regions at each of the plurality of timings; and
   determining, when a maximum value of the average value is equal to or more than a reference value, that the target object is present.

5. The target object detection apparatus according to claim 3, wherein
   the reference value is set for each of the plurality of the types.

6. The target object detection apparatus according to claim 1, wherein
   the likelihood information two-dimensionally indicates the distribution of the presence probabilities in the height direction and a horizontal direction.

7. The target object detection apparatus according to claim 1, wherein
   the target object is belongings of a person.

8. The target object detection apparatus according to claim 1, wherein
   a wavelength of the electromagnetic wave is equal to or more than 30 micrometers and equal to or less than one meter.

9. A target object detection method executed by a computer, wherein
   the computer is used together with an irradiation apparatus,
   the irradiation apparatus:
      executes, at a plurality of timings, processing of irradiating an electromagnetic wave to a region through which a target object passes, while the region being scanned, through which a target object passes; and
      receives a reflection wave acquired from the electromagnetic wave being reflected by the target object, and generates an IF signal being an intermediate frequency signal from the received reflection wave, and
   the target object detection method comprises: identifying, at each of the plurality of timings, a target object region where there is a possibility in that the target object is present and a type of the target object which may exist in the target region, by processing the IF signal; generating, at each of the plurality of timings, likelihood information for each of a plurality of the types of the target object, the likelihood information indicating a distribution of presence probabilities of the target object in at least a height direction in the target object region, based on processing results of the IF signal; and
      determining, for each of the plurality of the types of the target object, a presence or absence of the target object by using the likelihood information generated at each of the plurality of timings.

10. A non-transitory computer readable medium storing a program executable by a computer to perform processing, the computer being used together with an irradiation apparatus, wherein
   the irradiation apparatus:
      executes, at a plurality of timings, processing of irradiating an electromagnetic wave to a region through which a target object passes, while the region being scanned, through which a target object passes; and
      receives a reflection wave acquired from the electromagnetic wave being reflected by the target object, and generates an IF signal being an intermediate frequency signal from the received reflection wave, and
   the processing comprises:
      identifying, at each of the plurality of timings, a target object region where there is a possibility in that the target object is present and a type of the target object which may exist in the target region, by processing the IF signal; generating, at each of the plurality of timings, likelihood information for each of a plurality of the types of the target object, the likelihood information indicating a distribution of presence probabilities of the target object in at least a height direction in the target object region, based on processing results of the IF signal; and
      determining, for each of the plurality of the types of the target object, a presence or absence of the target object by using the likelihood information generated at each of the plurality of timings.

* * * * *